United States Patent [19]

Aizawa

[11] Patent Number: 4,855,755

[45] Date of Patent: Aug. 8, 1989

[54] THERMAL HEAD SUPPORTING MEANS IN THERMAL RECORDING APPARATUS

[75] Inventor: Isamu Aizawa, Tokyo, Japan

[73] Assignee: Graphtec Kabushiki Kaisha, Tokyo, Japan

[21] Appl. No.: 227,685

[22] Filed: Aug. 3, 1988

[30] Foreign Application Priority Data

| | | | |
|---|---|---|---|
| Oct. 22, 1987 | [JP] | Japan | 62-266969 |
| Oct. 22, 1987 | [JP] | Japan | 62-266970 |
| Jun. 14, 1988 | [JP] | Japan | 63-146090 |

[51] Int. Cl.[4] .............................. G01D 15/10

[52] U.S. Cl. .............................. 346/76 PH; 346/145; 346/139 R; 400/82; 400/120

[58] Field of Search .............................. 346/139 R, 145, 76 PH; 400/82, 120, 636.3, 59

[56] References Cited

U.S. PATENT DOCUMENTS

| | | | |
|---|---|---|---|
| 1,055,367 | 3/1913 | Stickney | 400/636.3 |
| 4,145,698 | 3/1979 | Wysong | 346/139 R |
| 4,151,397 | 4/1979 | Boor, Jr. et al. | 219/216 |
| 4,205,395 | 5/1980 | Shortridge | 346/76 PH |
| 4,213,135 | 7/1980 | Medvecky | 346/136 |
| 4,626,873 | 12/1986 | Kotani et al. | 346/139 R |
| 4,660,052 | 4/1987 | Kaiya et al. | 346/76 PH |
| 4,739,344 | 4/1988 | Sullivan et al. | 346/139 R |

FOREIGN PATENT DOCUMENTS

| | | |
|---|---|---|
| 0097976 | 7/1980 | Japan . |
| 0156080 | 12/1980 | Japan . |

*Primary Examiner*—E. A. Goldberg
*Assistant Examiner*—Huan H. Tran
*Attorney, Agent, or Firm*—Joseph S. Iandiorio

[57] ABSTRACT

In a thermal recording apparatus using a plurality of thermal heads supported by a head supporting means including a head supporting mechanism and a head pressing mechanism. The head supporting means includes single supporting units provided for correspondingly respectively supporting the thermal heads. Each of the single supporting units has a pair of hook-shaped members fixed to corresponding one of the thermal heads at two places of the rear surface thereof, and has a head supporting member having a pair of side end portions corresponding to the pair of hook-shaped members and a plane portion formed between the pair of side end portions and fixed to a rotatable pillar-shaped member. The head supporting member is engaged at its side end portions with the respective hook-shaped members so as to be movable in the vertical and rotational directions. The head pressing mechanism has a pair of compression springs for pressing the rear surface of each of the thermal head at a symmetric position, a pair of movable members for correspondingly respectively keeping the thermal heads through the compression springs, and a common movable member for arranging the pair of movable members on one straight line and for keeping the pair of movable members each other at symmetric positions.

4 Claims, 5 Drawing Sheets

THERMAL HEAD SUPPORTING MEANS IN THERMAL RECORDING APPARATUS

BACKGROUND OF THE INVENTION

The present invention relates to a thermal head supporting means in a thermal recording apparatus, and, more particularly, relates to a supporting means of this type provided with a supporting mechanism and a head pressing mechanism, the supporting mechanism having a plurality of thermal heads aligned on one line and each having a linear array of thermal elements.

Heretofore, various types of thermal recording apparatus using at least one thermal head have been put into practice. Particularly, in one type having a plurality of thermal heads which is the subject of the present invention, the thermal heads are arranged side by side in the direction transverse the advancing direction of recording paper, so that multi-channel recording can be realized without reduction of recording width for example even in recording various kinds of analog waveforms.

Generally, a recording apparatus of the type using a plurality of thermal heads requires uniform contacting property between each thermal head and recording paper during the recording operation and moderate space-retaining property between each thermal head and a holder member for holding recording paper. In the prior art apparatus, various proposals have been made for satisfying such requirement.

For example, an apparatus is disclosed in Japanese Patent Unexamined Publication No. 55-97976 (1980). The apparatus is provided with a plurality of thermal heads arranged in the direction perpendicular to the paper feeding direction. The thermal heads are mounted on a crankshaft having a crank so that the thermal heads are collectively moved up and down when the crankshaft is driven by an electric motor.

In another embodiment of the above-mentioned apparatus, a slight play or gap is provided in a junction between each of the thermal heads and the crankshaft, and pressure is exerted on the thermal head by use of compression spings.

Further, a variety of apparatus similar to that mentioned above are disclosed in U.S. Pat. Nos. 4,145,698; 4,660,052; 4,205,395, etc.

In any case of the aforementioned conventional techniques, head supporting mechanisms are attached to the respective thermal heads in one-to-one correspondency. There arises therefore a problem in that it is difficult to make the contacting property between the respective thermal heads and recording paper uniform.

If uniform contacting property between the respective thermal head and recording paper is to be attained in the aforementioned prior art apparatus, it has been necessary to keep the associated constituent parts with high accuracy.

Further, the aforementioned prior art apparatus has another problem in that the freedom (or movable region) of each thermal head at its supporting portion is limited excessively.

For example, in the above Japanese Patent Unexamined Publication, there is only a description that a slight clearance is formed in the junction between each thermal head and the crankshaft in the apparatus disclosed therein.

In the apparatus disclosed in the above U.S. Pat. No. 4,145,698, since torsion-coiled springs are used to support the respective thermal heads, each thermal head has freedom only in the circumferential direction.

SUMMARY OF THE INVENTION

It is therefore an object of the present invention to provide a thermal head supporting means for use in a thermal recording apparatus using a plurality of thermal heads, in which good contacting property and space-retaining property can be maintained between each thermal head and a recording panel and which is simple in construction, reliable in operation and superior in usefulness.

To attain the foregoing object, according to the present invention, the thermal head supporting means in a thermal recording apparatus comprises: a plurality of thermal heads; a head supporting mechanism including a pair of hook-shaped members symmetrically provided at two symmetrical places of a rear surface of each of the thermal heads, a rotatable pillar-shaped member, a head supporting member engaged with the pair of hook-shaped members for each of the thermal heads and having one end fixed to the rotatable pillar-shaped member; a rotating means for rotating the pillar-shaped member by a predetermined angle; a pair of springs for pressing the rear surface of each of the thermal heads; an engagement mechanism between the pair of hook-shaped members and the head supporting member including pins and elongated slots through which the pair of hook-shaped members are swingably supported at their one side ends by the head supporting member and including projections provided on the head supporting member so that the other side lower portions of the hook-shaped members come into abutting against the projections of the head supporting member; and the head supporting members corresponding in number to the thermal heads and being aligned side by side.

Further, according to the present invention, the thermal head supporting means in a thermal recording apparatus comprises: a pair of thermal heads; and a head pressing mechanism including head-urging compression springs arranged at a plurality of symmetrical places on a rear surface of each of the thermal heads, a pair of movable member for keeping the compression springs at symmetrical positions, and another movable member for keeping the pair of movable members on one straight line and at symmetrical positions, the other movable member being engaged with a fixation beam member at a center position of the other movable member.

BRIEF DESCRIPTION OF THE DRAWINGS

The accompanying drawings show an illustrative embodiment of thermal head supporting means in a thermal recording apparatus according to the present invention and, more particularly, show the arrangement of a heat supporting mechanism and a head pressing mechanism included in the thermal head supporting means, in which.

DESCRIPTION OF THE PREFERRED EMBODIMENTS

Figure 1:
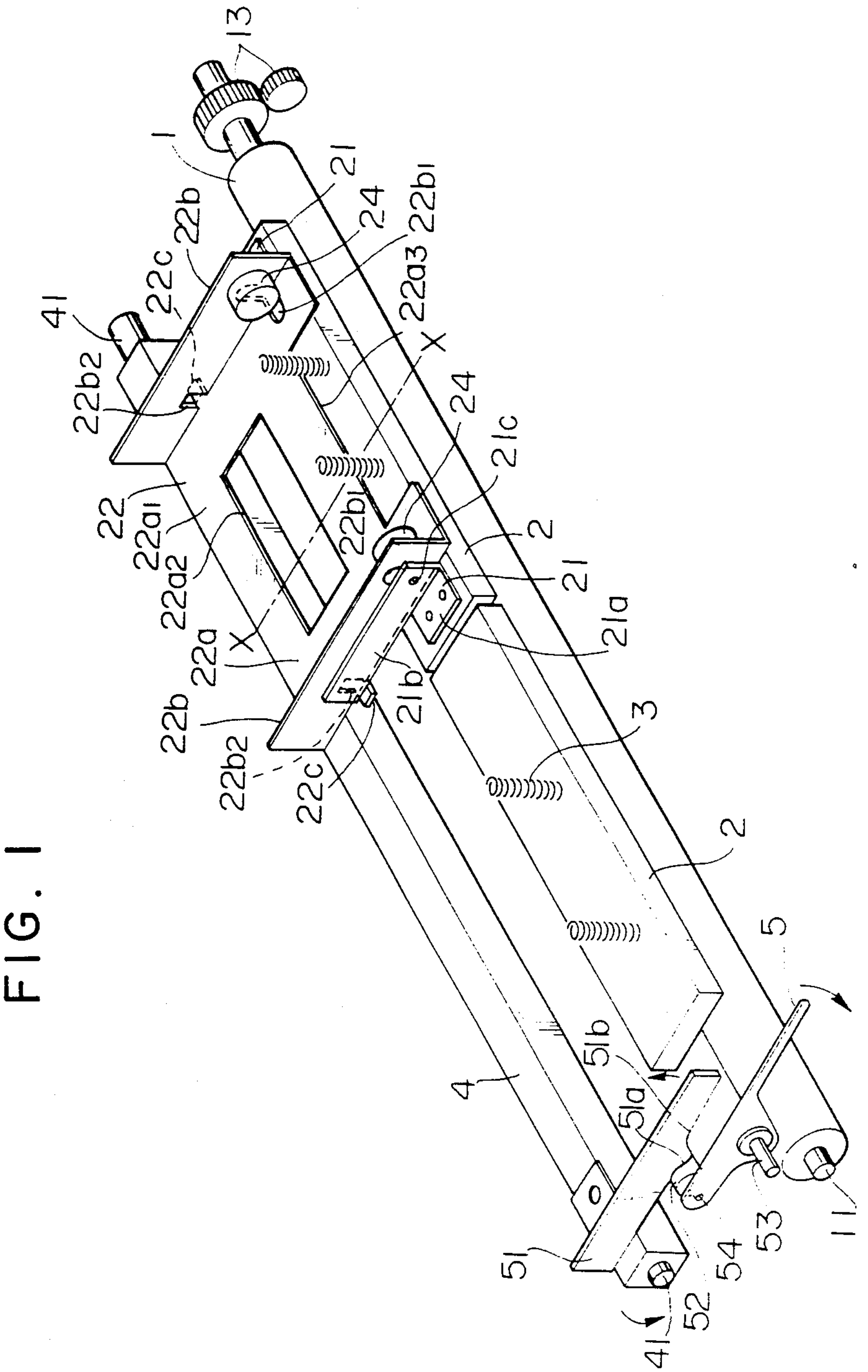
FIG. 1 is a perspective view of main part of the head supporting mechanism in the thermal head supporting means.

The head supporting mechanism in the thermal head supporting means of the present invention will be now described with reference to FIGS. 1 and 3. In the drawings, a recording paper feed platen 1 is rotatably supported by opposite side plates (not shown) of a chassis of a thermal recording apparatus through a platen shaft 11 passing through the axial center of the platen 1. The platen 1 is coupled at one end of its platen shaft 11 to an electric motor (not shown) through transmission gears 13 so that the platen 1 can rotate in a predetermined direction corresponding to the revolution of the motor due to a control signal applied to the motor. On the rear surface in each of thermal heads 2, a pair of hook-shaped members 21 are fixed at positions near to the longitudinally opposite ends thereof, respectively. As clearly shown in FIG. 1, the pair of hook-shaped members 21, 21 are substantially symmetric with respect to a virtual line X—X passing through the center of a thermal element array of the corresponding thermal head 2 and passing through the thermal head 2 in parallel to the feeding direction of recording paper. Each of the hook-shaped members 21 is composed of two parts formed by bending so as to be perpendicular to each other, or in other words, is composed of a base portion **21*a* which is relatively short, and an elongated portion 21*b* which is relatively long. The base portion 21*a* is used to fix the hook-shaped member 21 onto the rear surface of the thermal head 2** as described above.

On the other hand, the elongated portion **21*b* is perpendicularly erected from one side end of the base portion 21*a* and extends substantially horizontally from front to back. A pin 21*c* projecting horizontally from the substantially reverse side with respect to the base portion 21*a* is provided in the frontward portion of the elongated portion 21*b***.

The pin **21*c* is passed through an elongated slot 22*b*1 ranging from an erect portion 22*b* of a head supporting member 22 to a bottom portion thereof, and is fixed by a pin stop 24, so that thus a first engagement portion is formed. In the first engagement portion, the pin 21*c* can be removed from the bottom-portion side of the elongated slot 22*b*1 by unfastening the pin stop 24 from the pin 21*c* mounted to the hook-shaped member 21*c*. Accordingly, the thermal head 2 can be easily removably attached. On the other hand, in the backward portion of the elongated portion 21*b* of the hook-shaped member 21, the lower side of the elongated portion 21*b* is made to abut against a projection 22*c* provided at a corresponding position of the erect portion 22*b* of the head supporting member 22, so that a second engagement portion is thus formed. Although this embodiment shows the case where the projection 22*c* is formed by outward horizontally opening a U-shaped notch provided in the vicinity of the backward lower end of the erect portion 22*b*, it is a matter of course that the invention is not limited to the specific embodiment and that, for example, the projection 22*c* may be formed by a U-shaped piece which is provided separately from the erect portion 22*b* of the head supporting member 22 and is fixed to the backward lower end of the erect portion 22*b*. Further, the head supporting member 22 is fixed to a rotatable pillar-shaped member 4 at the backward end of the bottom portion 22*a*. As clearly shown in the drawings, the U-shaped notch 22*b*2, that is, the projection 22*c*, formed in the erect portion 22*b*, is located at a predetermined distance from the elongated slot 22*b*1 provided in the erect portion 22*b***.

Further, a cutaway portion **22*a*3 is formed in the forward end of the bottom portion 22*a* of the head supporting member 22. Furthermore, a window portion 22*a*2 is provided in almost the center of the bottom portion 22*a* while leaving the backward end thereof. In the head pressing mechanism which will be described later, compression springs 3 for pressing each thermal head 2 are arranged to be contact with the rear surface of the thermal head 2 through the cutaway portion 22*a*3**.

In this embodiment, two sets of the same construction each including the head supporting member 22, the pair of hook-shaped members 21 and the thermal head 2 are mounted on the rotatable pillar-shaped member 4. It is however to be understood that the construction illustrated in FIG. 1 is partly omitted for the purpose of avoidance of complexity and that the details thereof are on one set.

The pillar-shaped member 4 is rotatably supported, through a shaft 41, by the opposite side plates (not shown) of the chassis of the recording apparatus. A rod-like transmission member 51 is fixed to the left end portion of the top surface of the pillar-shaped member 4 at a mount portion disposed at the rear end thereof. Further, the transmission member 51 is bent substantially vertically from the mount portion and has a rod-like portion extending from back to front. In the lower side of the rod-like portion, a first cam surface **51*a* and a second cam surface 51*b* are formed so as to be continuous to each other. The two cam surfaces 51*a* and 51*b* are provided with the form capable of engaging with a transmission roller provided at the rear end of a turnlever 5. A bearing shaft 53 inserted in a center hole 5*a* of the turnlever 5 is rotatably fixed to the side plates (not shown) of the chassis of the recording apparatus, so that the turnlever 5 can rotate manually in the direction of the arrow in the drawing or in the reverse direction thereto. When the transmission roller 52 at the rear end of the turnlever 5 is engaged with the first cam surface 51*a* of the transmission member 51, the thermal head 2 comes into close contact with the platen 1. When the transmission roller 52 is engaged with the second cam surface 51*b* by turning of the turnlever 5 in the direction of the arrow, the front end of the transmission member 51 turns and ascends in the direction of the arrow. Because the mount portion at the rear end of the transmission member 51 is fixed to the top surface of the rotatable pillar-shaped member 4 as described above, the pillar-shaped member 4 is turned on the shaft 41 in the direction of the arrow. As the result of such turning movement of the pillar-shaped member 4, the head supporting member 22 turns because the backward end thereof is fixed onto the top surface of the pillar-shaped member 4. Accordingly, the thermal head 2 moves upward so that a space with a predetermined distance between the thermal head 2 and the platen 1 is formed. Therefore, the attachment/detachment of thermosensitive recording paper on the platen 1 can be easily made by a human operator. In this embodiment, each of the second cam surface 51***b*, the transmission roller 52 and the bearing shaft 53 is provided at a specific position. Accordingly, the turnlever 5 is arranged so that the force thereof is balanced to the transmission member 51 when the transmission roller 52 is engaged with the second cam surface 51*b*. In this embodiment, therefore, it is not necessary to provide any specific lock mechanism in the turnlever.

Figure 3:
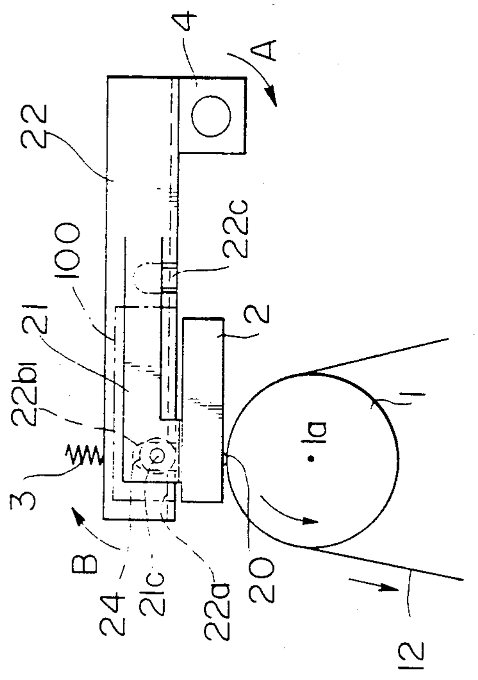
FIG. 3 is a shematic side view of the head supporting mechanism depicted in FIG. 1.

FIG. 3 is a side view seen from right of the head supporting mechanism depicted in FIG. 1. When, for example, the shaft 4 is turned in the direction of the arrow A by the turnlever 5, the head supporting member 22 simultaneosuly moves in the direction of the arrow B. At an initial stage of this case, or in other words, before the pin 21*c* provided in the hook-shaped member 21 fixed to the rear surface of the thermal head 2 is made to abut against an upper end of the elongated slot 22*b*1 provided in the erect portion 22*b* of the head supporting member 22, the thermal head 2 does not move. After the turnlever 5 is further turned so that the pin 21*c* is made to abut against the upper end of the elongated slot 22*b*1 by turning of the transmission member and pillar-shaped member, the thermal head 2 moves upward against the urging force of the compression springs 3 provided for pressing the head 2. In the condition of upward movement of the thermal head 2, a space or clearance is formed between the thermal head 2 and the platen 1 to enable recording paper 12 to be attached/detached.

In the case where the thermal head 2 is brought into close contact with the platen 1 by turning of the turnlever in the direction reverse to the arrow of FIG. 1, the substantially reverse operation is carried out. In FIG. 3, the thermal head 2 is first brought into contact with the platen 1 by the urging force of the compression springs 3 provided for pressing the head 2, but the pin 21*c* is not made to abut against the upper end of the elongated slot 22*b*1 of each of the erect portions 22*b* of the head supporting member 22. For this reason, the hook-shaped members 21 become free from the head supporting member 22. Accordingly, only the urging force of the compression springs 3 acts on the thermal head 2 to thereby loosen the impact of the platen 1 against the thermal head 2.

In this embodiment, the engagement between the rear end lower portions of the respective hook-shaped members 21 and the corresponding projections 22*c* of the head supporting member 22 functions to stop the thermal head 2 from rotating corresponding to the movement of recording paper 12 in the case where, for example, the recording paper 12 is moved in a predetermined direction by the rotation of the platen 1. In this embodiment, a thermal element array 20 of the thermal head 2, the pins 21*c* of the hook-shaped member 21, the elongated slots 22*b*1 of the respective head supporting members 22 and the compression springs 3 are aligned along a straight line passing through a center 1*a* of a circular section of the platen 1, so that the thermal elements in array 20 of the thermal heads 2 can be brought into close contact with recording paper on the platen 1 by substantially uniform urging force over the whole width of the paper.

Figure 5A:
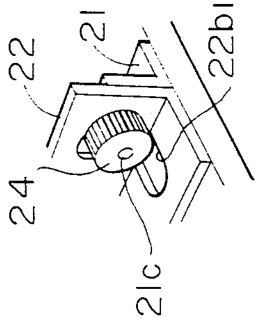
FIGS. 5A, 5B and 5C are enlarged perspective views for explaining a process of from an engagement state to a disengagement state, of one engagement means used in the head supporting means in the aforementioned embodiment.
Figure 5B:
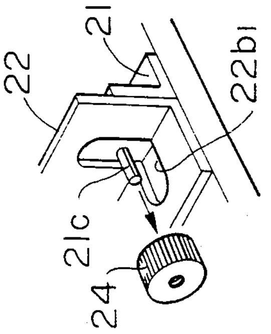
Figure 5C:
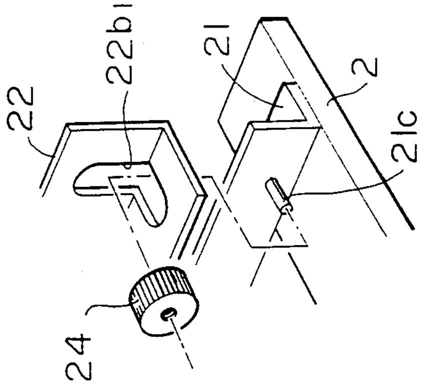

In this embodiment, the diameter of the pin 21*c* of each hook-shaped member 21 is established to be smaller than the width of the corresponding elongated slot 22*b*1 of the head supporting member 22. Because the thermal head 2 is arranged so as to be suspended from the head supporting member 22 as described above, the thermal head 2 has freedom in at least two directions including a rotational direction and a vertical direction, with respect to the head supporting means including the head supporting member 22. By way of example and to make this point more clear, reference is made to FIGS. 5A, 5B and 5C. Referring to FIG. 5A, there is shown a state in which the pin 21*c* and the pin stop 24 are engaged with each other. The state of FIG. 5A corresponds to the state of engagement of FIG. 1 which is formed at each of the pair of side end portions 22*b* of the head supporting member 22 and the respective forward portions of the pair of hook-shaped members 21. When the pin stop 24 in the state of FIG. 5A is turned to unfasten the pin 21*c* as shown in FIG. 5B, the pin 21*c* which has been fixed to the hook-shaped member 22 becomes in a condition in which is can pass vertically through the horizontal portion of the elongated slot 22*b*1 formed in the head supporting member 22. Accordingly, as shown in FIG. 5C, a combination of the thermal head 2 and the pair of hook-shaped members 21 fixed thereto is released downward in the drawing, together with other combinations which are in the same state. In the case where the thermal head 2 is attached, explanation will be made by the quite reverse way. Accordingly, the attachment/detachment of the thermal head 2 can be made easily and speedily.

In the following, the head pressing mechanism in the thermal head supporting means of the present invention is described with reference to FIGS. 2A, 2B and 4. The construction shown in FIG. 2B in substantially similar to that shown in FIG. 2A. Particularly, FIG. 2B is provided to more clarify the three-dimensional relationship in arrangement between the supporting mechanism as described above with reference to FIG. 1 and the head pressing mechanism. For the purpose of avoidance of complexity, the head supporting mechanism as described above with reference to FIGS. 1 and 3 is not shown in FIGS. 2A, 2B and 4. In the place or instead, to clarify the relationship between the head pressing mechanism and the head supporting mechanism, a portion corresponding to the head supporting mechanism of FIGS. 2A, 2B and 4 is represented by a block 100 as indicated by a dot-and-dash line in FIG. 3.

Figure 2A:
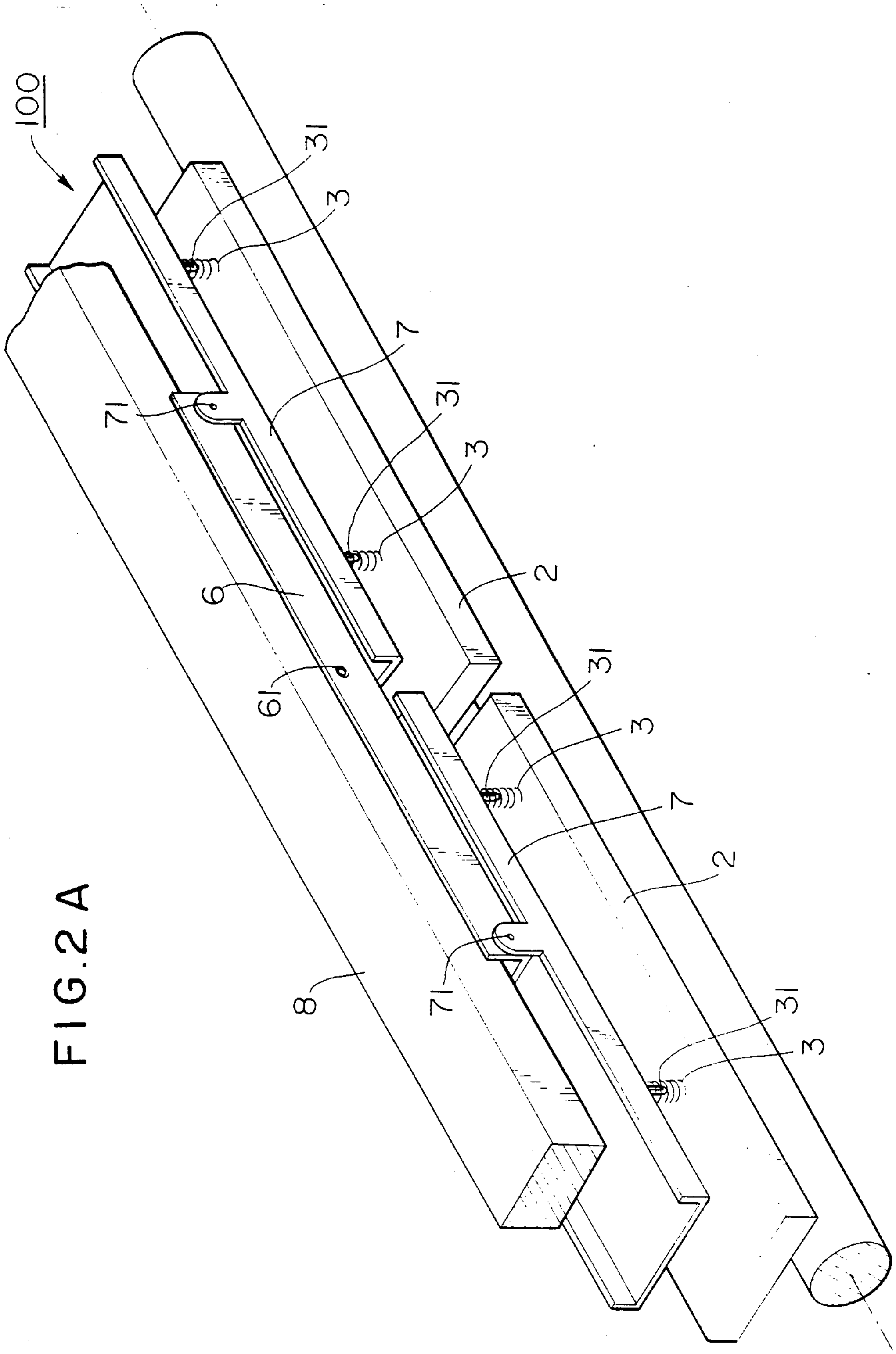
FIGS. 2A and 2B are perspective views of main part of the head pressing mechanism in the thermal head supporting means, in which FIG. 2B particularly shows the positional relationship between the head pressing mechanism and the head supporting mechanism depicted in FIG. 1.
Figure 2B:
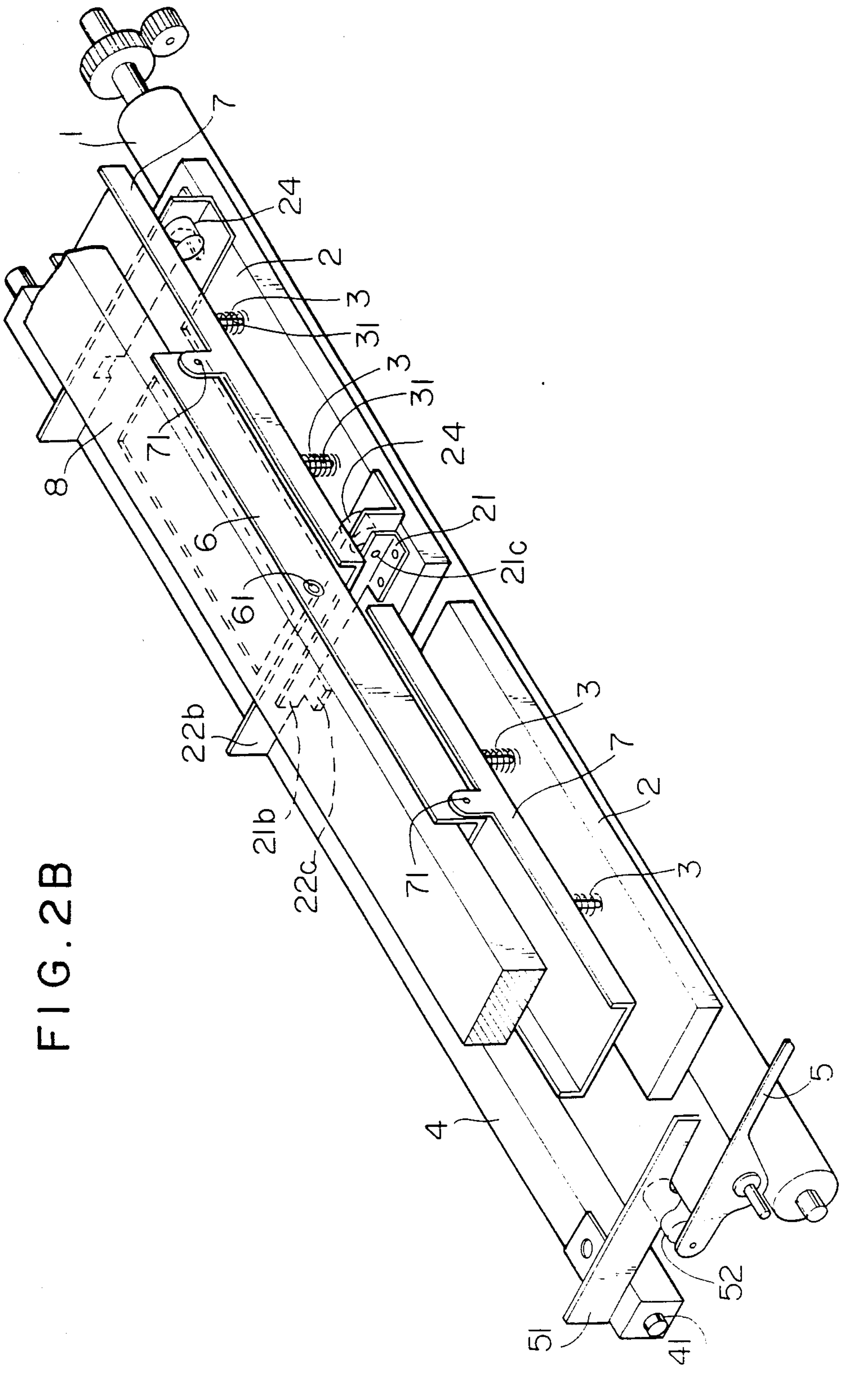

In FIGS. 2A and 2B, two head-urging compression springs 3 being in abutting upon the corresponding thermal head are respectively held by spring holders 31 provided on corresponding one of second movable members 7. Because FIGS. 2A and 2B show the case where two thermal heads 2 are provided, two second movable members 7 are provided corresponding to the respective thermal heads 2. The second movable members 7, 7 are rotatably supported by the first movable member 6 provided commonly to the two second movable members 7 through pivots 71, 71 respectively, at the left and right ends of the first movable member 6 and at positions symmetric with respect to the center of the first movable member 6. The first movable member 6 is rotatably supported, through a pivot 61, by a beam member 8 fixed between the opposite side plates (not shown) of the chassis of the recording apparatus. The two pivots 71, 71 for supporting the second movable members 7 at the left and right ends of the first movable member 6 are at an equal distance from the pivot 61 for pivotally supporting the first movable member 6. The two head-urging compression springs 3, 3 provided to the corresponding second movable member 7 are at an equal distance from the corresponding pivot 71 for pivotally supporting the second movable member 7 on the first movable member 6.

Figure 4:
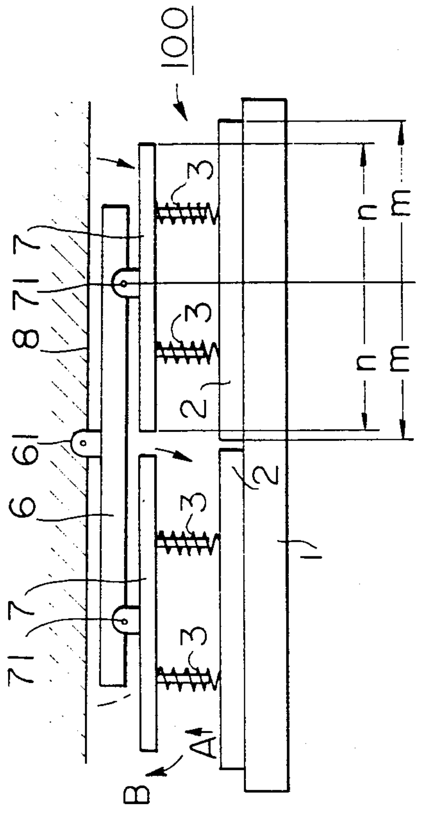
FIG. 4 is a shematic side view of the head pressing mechanism depicted in FIGS. 2A and 2B.

Referring to FIG. 4 in in which the construction of the head pressing mechanism is illustrated as a model, it is apparent that substantially uniform urging force due to the two compression springs 3 acts on the corresponding thermal head 2. On the other hand, substantially uniform urging force acts on the corresponding second movable member 7 supporting the two compression springs 3 in the same manner. Accordingly, if four head-urging compression springs 3 are arranged to be equalized in strength, the most stable condition can be attained in the case of FIG. 4 or in other words when the first movable member 6 and the second movable members 7 are parallel to the two thermal heads 2.

Practically, it is very difficult to obtain four compression springs 3 exactly having the same size and same characteristic, especially same strength. The attempt to produce compression springs of the same size and same characteristic is attendant on various troublesome manufacturing problems. However, according to the invention, the urging force acting on the thermal heads 2 through the four compression springs 3 is always kept uniform for the following reason even if there are variations in size and strength among the four springs 3. When, for example, upward force as shown by the arrow A in FIG. 4 is applied, the force urges the left-side second movable member 7 to turn in the direction of the arrow B about the pivot 71. Then left one of the two compression springs 3 is urged to stay at the current position, whereas the right one thereof is urged to return to the original position. When, for example, downward force as shown by the dot-line arrow in FIG. 4 is applied to the right end or left end of the first movable member 6, the right-side second movable member 7 moves downward to thereby urge the corresponding pair of compression springs 3 to move in the direction of the dot-line arrow. Accordingly, the right-side compression springs 3 are urged to stay at the current position. As this result, the second movable members 7 can be kept in a stable position. While the left end of the first movable member 6 is urged to move upward as shown by the dot-line arrow, the left-side second movable member 7 is urged to move also upward. Then the pair of compression springs 3 corresponding to the left-side second movable member 7 are urged to expand against the compressing force thereof, so that the compression springs 3 are urged to return to the original position. Accordingly, the first movable member 6 can be kept in a stable state. As described above, according to this embodiment, the head pressing mechanism 100 including the compression springs 3, the second movable members 7 and the first movable member 6 functions to keep the movable members in a stable state at all times, so that urging force given to the respective thermal heads can be kept uniform.

It is apparent from the above description that, according to the present invention, the head supporting member for rotatably supporting the corresponding thermal head is arranged to be supported by the hook-shaped members having two engagement portions having freedom, and that very good head-contacting property and space-retaining property can be attained by a relatively simple construction in the thermal recording apparatus having a plurality of thermal heads. Furthermore, according to the invention using a first movable member and a pair of second movable members, predetermined urging force is given to each of the thermal heads through the second movable member having a plurality of head-urging compression springs symmetrically disposed thereon and the first movable member for keeping the pair of second movable members in symmetric positions, so that uniform urging force can be given to all of the thermal heads in spite of the relatively simple construction.

What is claimed is:

1. In a thermal recording apparatus in which a plurality of thermal heads provided with thermal element arrays aligned at lower surfaces of said thermal heads are made to be slidably in contact with a recording medium transported on a platen to thereby perform recording on said recording medium, means for supporting said plurality of thermal heads, said means comprising:

(A) a thermal head supporting mechanism including a plurality of single supporting units provided for correspondingly respectively supporting said thermal heads and aligned in a direction perpendicular to a direction of movement of said recording medium, each of said single supporting unit including:

(i) a pair of hook-shaped members fixed to each of said thermal heads at two places on a rear surface of said thermal head, and (ii) a thermal head supporting member having a pair of side end portions corresponding to said pair of hook-shaped members and a plane portion between said pair of side end portions, said thermal head supporting member being engaged with said side end portions at predetermined positions thereof so as to be movable in at least two directions including a vertical direction and a rotational direction relative to the respective hook-shaped members, said plane portion having a cutaway portion formed at a predetermined position thereof and a backward edge fixedly attached to a rotatable member having a rotary shaft; and (B) a thermal head pressing mechanism including a pair of movable members each for keeping at least one head-urging compression spring at a symmetrical position on corresponding one of said thermal heads of said head supporting mechanism so as to press the rear surface of said corresponding thermal head, and further including a common movable member for keeping said pair of movable members arranged on one straight line and at symmetrical positions, said common movable member being engaged with a fixation beam member at a symmetric position.

2. A thermal recording apparatus according to claim 1, in which:

each of said hook-shaped members has a base portion fixed to an upper surface of corresponding one of said thermal heads, and an elongated portion erected from one side end of said base portion and extended substantially horizontally from front to back, said elongated portion is provided with a pin arranged at a front portion of said elongated portion and projected horizontally therefrom;

said two side end portions of said thermal head supporting member are formed as a pair of erect portions erected from said plane portion which is formed substantially like a square, each of said erect portions having an elongated slot formed at a front portion thereof and extended from said erect portion to said plane portion and further having a projection formed at a rear portion thereof; and said hook-shaped members are supported by said thermal head supporting member so as to be movable in at least two directions including a vertical direction and a rotational direction through engagement between said pins provided at the respective front portions of said hook-shaped member and said elongated slots formed at the respective front portions of said erect portions of said thermal head supporting member, respective backward lower end portions of said elongated portions of said hook-shaped members being made to abut against said respective projections of said erect portions of said thermal head supporting member to thereby form an engagement mechanism between each of said hook-shaped members and said thermal head supporting member.

3. A thermal recording apparatus according to claim 1, in which said single supporting units are two in number and are arranged side by side to form said thermal head supporting mechanism.

4. A thermal recording apparatus according to claim 1, in which:

said rotatable member carrying said single supporting units fixed thereon is rotatably supported to a chassis and has one end on which a transmission member is attached, said transmission member having a first cam surface and a second cam surface; and a lever means for supporting a transmission roller capable of engaging with both side first and second cam surfaces of said transmission member is rotatably mounted to said chassis.

* * * * *